(12) United States Patent
Kim

(10) Patent No.: US 7,181,253 B2
(45) Date of Patent: Feb. 20, 2007

(54) DUAL-WING FOLDER RADIO TELEPHONE

(75) Inventor: Tae-Hun Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 543 days.

(21) Appl. No.: 10/272,124

(22) Filed: Oct. 16, 2002

(65) Prior Publication Data

US 2003/0096582 A1 May 22, 2003

(30) Foreign Application Priority Data

Nov. 19, 2001 (KR) ............................ 2001-72128

(51) Int. Cl.
*H04M 1/00* (2006.01)
(52) U.S. Cl. ............................ 455/575.1; 455/575.3; 455/90.3; 379/433.01; 379/433.13
(58) Field of Classification Search ............ 455/550.1, 455/556.1, 90, 575, 575.1, 575.7, 575.3, 455/575.8, 90.3; 379/433.01–434
See application file for complete search history.

(56) References Cited

U.S. PATENT DOCUMENTS

| | | | | |
|---|---|---|---|---|
| 5,564,085 A | * | 10/1996 | Chen et al. .................. | 455/117 |
| 6,377,827 B1 | * | 4/2002 | Rydbeck .................... | 455/575.3 |
| 6,463,263 B1 | * | 10/2002 | Feilner et al. .............. | 455/90.1 |
| 6,510,325 B1 | * | 1/2003 | Mack et al. ............... | 455/575.2 |
| 6,731,753 B2 | * | 5/2004 | Park et al. ............... | 379/433.07 |
| 6,754,507 B2 | * | 6/2004 | Takagi ....................... | 455/550.1 |
| 6,983,175 B2 | * | 1/2006 | Kwon ........................ | 455/575.1 |
| 2001/0011030 A1 | * | 8/2001 | Kuroda ........................ | 455/90 |
| 2001/0029173 A1 | * | 10/2001 | Ogino ....................... | 455/279.1 |
| 2002/0077145 A1 | * | 6/2002 | Kamiya et al. ............. | 455/550 |
| 2002/0137537 A1 | * | 9/2002 | Watanabe .................... | 455/550 |
| 2002/0146989 A1 | * | 10/2002 | Moriki ........................ | 455/90 |

FOREIGN PATENT DOCUMENTS

CN          1189756 A       5/1998

* cited by examiner

*Primary Examiner*—George Eng
*Assistant Examiner*—Nam Huynh
(74) *Attorney, Agent, or Firm*—The Farrell Law Firm

(57) ABSTRACT

A dual-wing folder radio telephone is provided. The dual-wing folder radio telephone includes a lower housing, a middle housing, and an upper housing that are connected to a hinge axis. The lower housing has hinge arms formed in one end thereof. Further, the lower housing has a battery mounted on the lower surface and a microphone mounted on the upper surface. The middle housing has hinge arms formed in one end thereof. Further, the middle housing includes a keypad, in which a plurality of keys are arranged, installed on the upper surface, and a main printed circuit board installed therein. The upper housing includes a hinge arm formed in one end, and an LCD and a speaker mounted thereon.

7 Claims, 5 Drawing Sheets

DUAL-WING FOLDER RADIO TELEPHONE

PRIORITY

This application claims priority to an application entitled "Dual-Wing Folder Radio Telephone" filed in the Korean Industrial Property Office on Nov. 19, 2001 and assigned Ser. No. 2001-72128, the contents of which are hereby incorporated by reference.

BACKGROUND OF THE INVENTION

1. Field of the Invention

The present invention relates generally to a portable radio telephone, and in particular, to a dual-wing folder radio telephone, which is capable of preventing the radio telephone from harming the human body and letting a user more conveniently use the radio telephone by dividing the housing of the radio telephone into three parts.

2. Description of the Related Art

In general, a portable telephone is either a bar-type portable telephone type, a flip-type portable telephone type, or a folder-type portable telephone type. Portable telephones are also available as a neck wearable type or a wrist type, according to wearing positions. The portable telephones facilitate audio communication, video communication, and Internet communication, as well as a combination of these functions. Currently, the bar-type portable telephone, the flip-type portable telephone, and the folder-type portable telephone are commonly used, and it is predicted that portable telephones will adopt more various wearing methods, for the convenience of wearing and portability.

A conventional portable telephone will now be described taking the folder-type telephone as an example. The conventional folder-type telephone includes a lower housing 10 that functions as a main body and an upper housing 12 that functions as a folder. The upper housing 12 is connected to the lower housing 10 by a hinge means 14 so as to fold the upper housing 12 toward and against the lower housing 10 and to unfold the upper housing 12 away from the lower housing 10 upward to a predetermined angle.

A liquid crystal display (LCD) 16 and a speaker 18 are installed in an inner surface 12a of the upper housing 12. A keypad 20 including a plurality of keys is installed in an inner surface 10a of the lower housing 10. A microphone 22 is built in the inside where a bole is formed beneath where the keypad 20 is installed. Dampers 24 are installed on both sides of the place where the microphone 22 of the lower housing 10 is installed so as to absorb the shock generated by the collision between the upper housing 12 and the lower housing 10 when the upper housing is folded against the lower housing 10.

The telephone is used by unfolding the upper housing 12 away from the lower housing 10 when a user tries to answer a telephone call (i.e. an audio call) or to make a telephone call.

The keypad 20, in which the plurality of keys are arranged, is used as a typical data input means of the portable telephone, while the LCD 16 is used as a data output means. More recently, a touch screen or a touch pad is also used as a data input means.

The trend, however, is to make radio telephones lighter and smaller. When the main body of the telephone is miniaturized, the LCD and the keypad must also be miniaturized. When the LCD is miniaturized, it is not easy for the user to check (read) displayed data. When the keypad is miniaturized, it is not easy to input data. The miniaturization of the radio telephone is restricted due to the above-mentioned problems. That is, it is difficult to make the LCD and the keypad large while miniaturizing the portable telephone.

Also, additional and more varied functions are required to be performed as radio telephones perform the Internet function. In order to perform such varied functions, more keys and a wider LCD are required. Such use of radio telephones requires more keys and a wider LCD, as necessary for transmission of e-mails, chatting, and additional services such as those that are performed when the radio telephone audio functions as a personal digital assistant (PDA).

In the folder-type telephone, because the LCD and the keypad contact the face of a user during a telephone call, cosmetics of women and sweat and body wastes may attach to the LCD and the keypad. In addition to being unpleasant to the user, the accumulated waste may be harmful, especially to allergic users. Therefore, the unpleasantness increases with use, requiring the user to clean the LCD and the keypad after a few telephone calls. Such polluting of the LCD obstructs the view of the user in the LCD, which is particularly troublesome when performing a web search or accessing an interactive service.

SUMMARY OF THE INVENTION

It is, therefore, an object of the present invention to provide a dual-wing folder radio telephone, which is capable of minimizing unpleasantness and preventing harm to the human body, as well as letting a user more conveniently use the radio telephone by dividing the housing of the radio telephone into three parts.

It is another object of the present invention to provide a dual-wing folder radio telephone, which is capable of letting a user more conveniently use the radio telephone by including a middle housing, in which a keypad is installed, between an upper housing and a lower housing.

It is further another object of the present invention to provide a dual-wing folder radio telephone in which a liquid crystal display (LCD) and a keypad are hidden and protected from contamination during a telephone call.

It is yet another object of the present invention to provide a dual-wing folder radio telephone which is capable of reducing the amount of electromagnetic energy to which the human body is exposed by diverting an antenna away from the user during a telephone call.

It is still another object of the present invention to provide a dual-wing folder radio telephone which improves the viewability of the LCD and reduces the frequency that the LCD must be cleaned and protects the LCD and the keypad from alien objects and contamination.

It is still another object of the present invention to provide a dual-wing folder radio telephone which is capable of letting a user pleasantly contact the radio telephone by attaching a rubber pad to a surface where a middle housing contacts the lower housing, wherein the rubber pad may also be capable of intercepting the electromagnetic waves.

The above and other objects reduce inconvenience to a user of a radio telephone that is used as an interactive information apparatus such as an Internet search (wherein the user's eyes and fingers contact the LCD and the keypad) and a communication apparatus (wherein the user's ear and mouth contact the telephone).

To achieve the above and other objects, an embodiment of the dual-wing folder radio telephone includes a lower housing, a middle housing, and an upper housing that are connected to a hinge axis. The lower housing has hinge arms formed in one end thereof. Further, the lower housing has a battery mounted on the lower surface and a microphone mounted on the upper surface. The middle housing has hinge arms formed in one end thereof. Further, the middle housing includes a keypad, in which a plurality of keys are arranged, installed on the upper surface, and a main printed circuit board installed therein. The upper housing includes a hinge arm formed in one end, and an LCD and a speaker mounted thereon.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
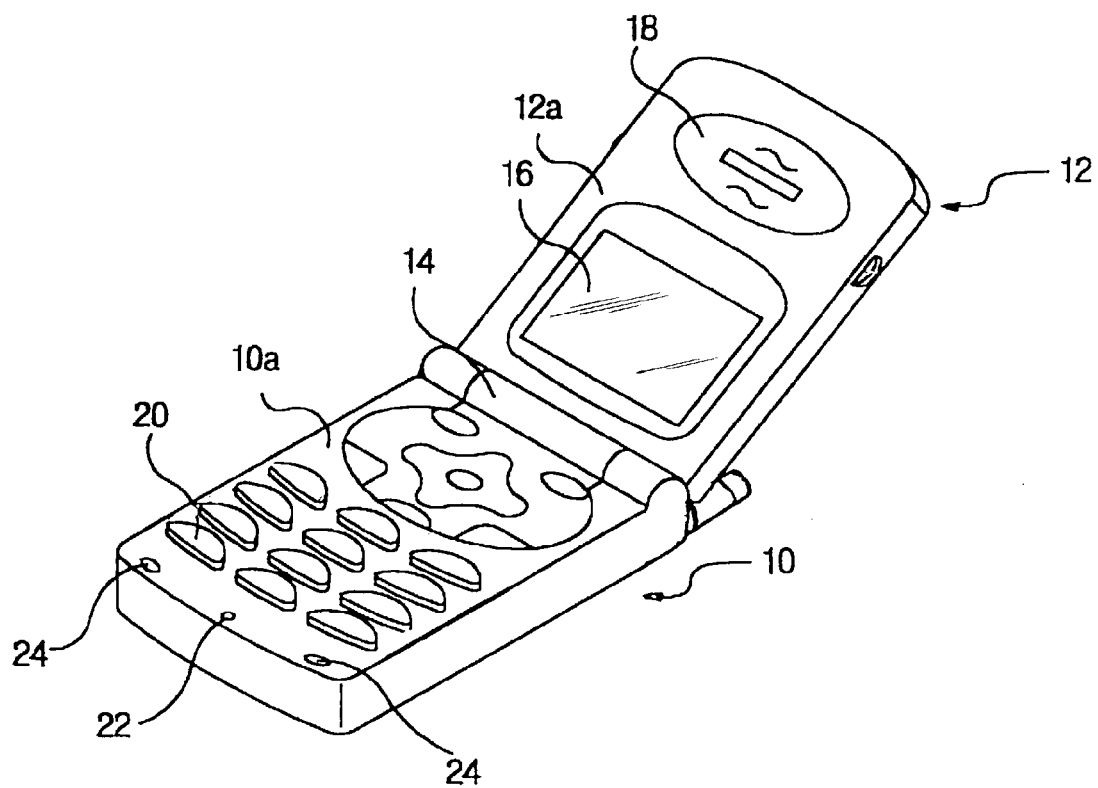
FIG. 1 is a perspective view showing a conventional folder-type radio telephone.
Figure 2:
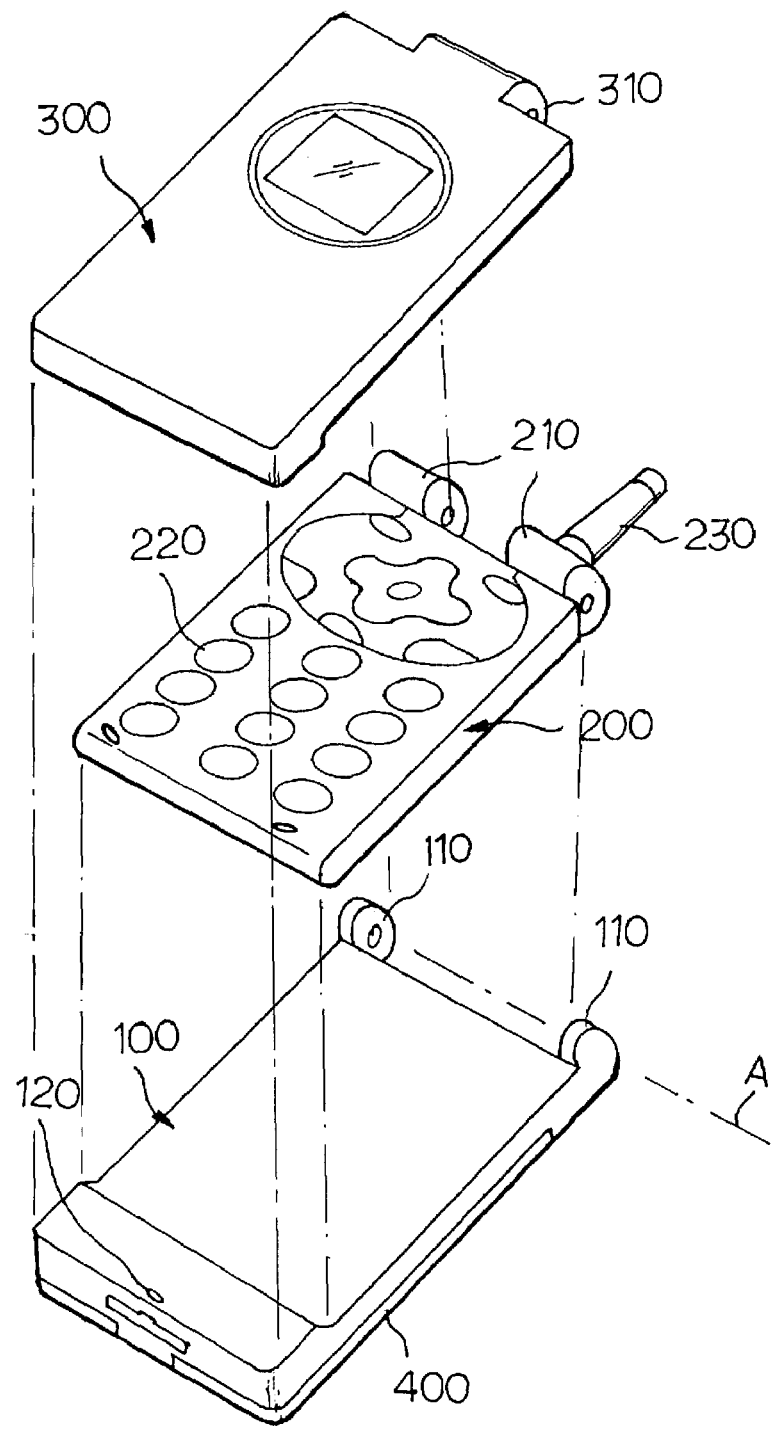
FIG. 2 is a perspective view showing a state in which the housings of a radio telephone according to an embodiment of the present invention are disassembled.
Figure 3:
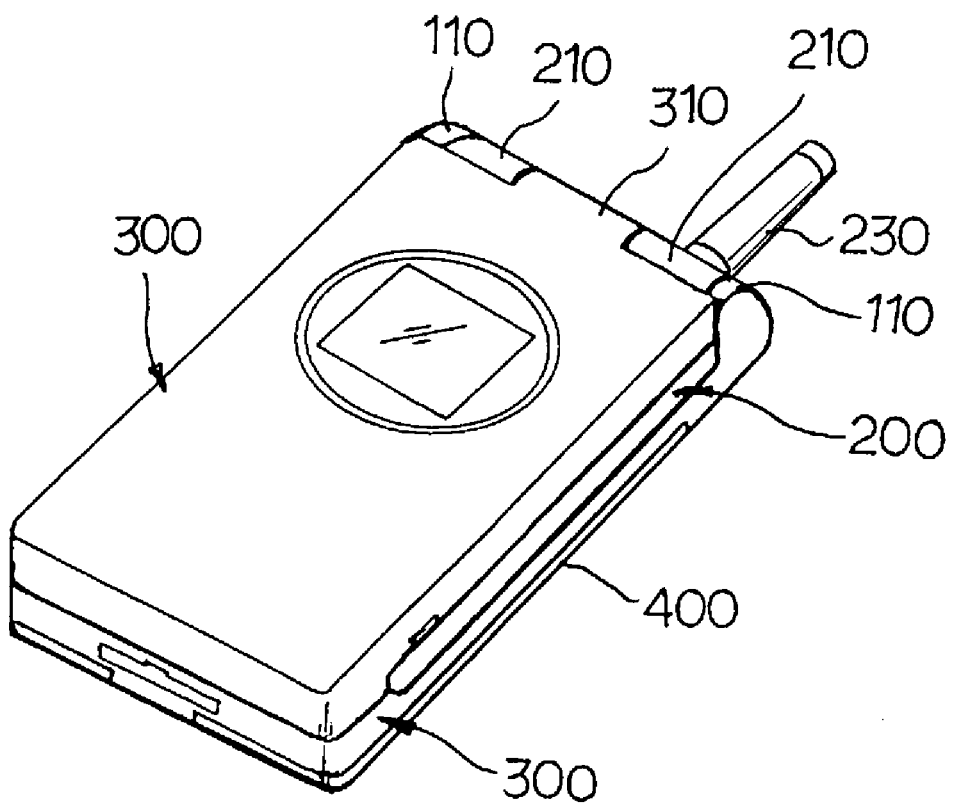
FIG. 3 is a perspective view showing a state in which the housings of the radio telephone according to the embodiment of the present invention are assembled.

A preferred embodiment of the present invention will be described herein below with reference to the accompanying drawings. In the following description, well-known functions or constructions are not described in detail since they would obscure the invention with unnecessary detail.

The structure and operation of a dual-wing folder radio telephone according to an embodiment of the present invention will now be described with reference to FIGS. 2 through 5.

The dual-wing folder radio telephone according to an embodiment of the present invention includes three housings rotatably connected to each other by a hinge axis A. The three housings includes a lower housing 100, a middle housing 200, and an upper housing 300 that are connected to the hinge axis A.

Hinge arms 110 are formed in one end of the lower housing 100. A battery 400 is mounted on the lower surface of the lower housing 100 and a microphone 120 is mounted on the upper surface. Hinge arms 210 are formed in one end of the middle housing 200. A keypad 220 is mounted on the upper surface of the middle housing 200 and a main printed circuit board (PCB) is mounted inside the middle housing 200. A hinge arm 310 is formed on one end of the upper housing 300. A liquid crystal display (LCD) 320 and a speaker 330 are mounted on the upper housing 300.

The hinge arms 110 of the lower housing 100 are preferably formed on both ends of one end of the lower housing 100. The hinge arms 210 of the middle housing 200 are preferably formed to be separated from each other from the center of one end of the middle housing 200 toward both ends of the middle housing 200. The hinge arm 310 of the upper housing 300 is preferably formed in the center of one end of the upper housing 300. The hinge arms 210 of the middle housing 200 are combined between both hinge arms 110 of the lower housing 100, and the hinge arm 310 of the upper housing 300 is combined between the hinge arms 210 of the middle housing 200, allowing the hinge axis A is formed in a straight line. As one of skill in the ail will readily appreciate, the relative position of, as well as the number of, hinge arms can vary.

Further, an antenna 230 may be installed in one hinge arm 210 of the middle housing 200. The respective housings can be folded against or unfolded away from each other, allowing overlap similar to that of a conventional folder. When the upper housing 300 is folded against both the middle housing 200 and the lower housing 100, the middle housing 200 overlaps the lower housing 100. When the middle housing 200 is unfolded away from the lower housing 100, the middle housing 200 overlaps the upper housing 300. Accordingly, the housings can be separately used during connecting the Internet and making a telephone call.

Further still, an electromagnetic wave intercepting means such as a rubber pad may be installed on the upper surface of the lower housing 100 as well as, or alternatively, on the lower surface of the middle housing 200 to minimize the amount of the electromagnetic wave, to which the human body is exposed.

Figure 4:
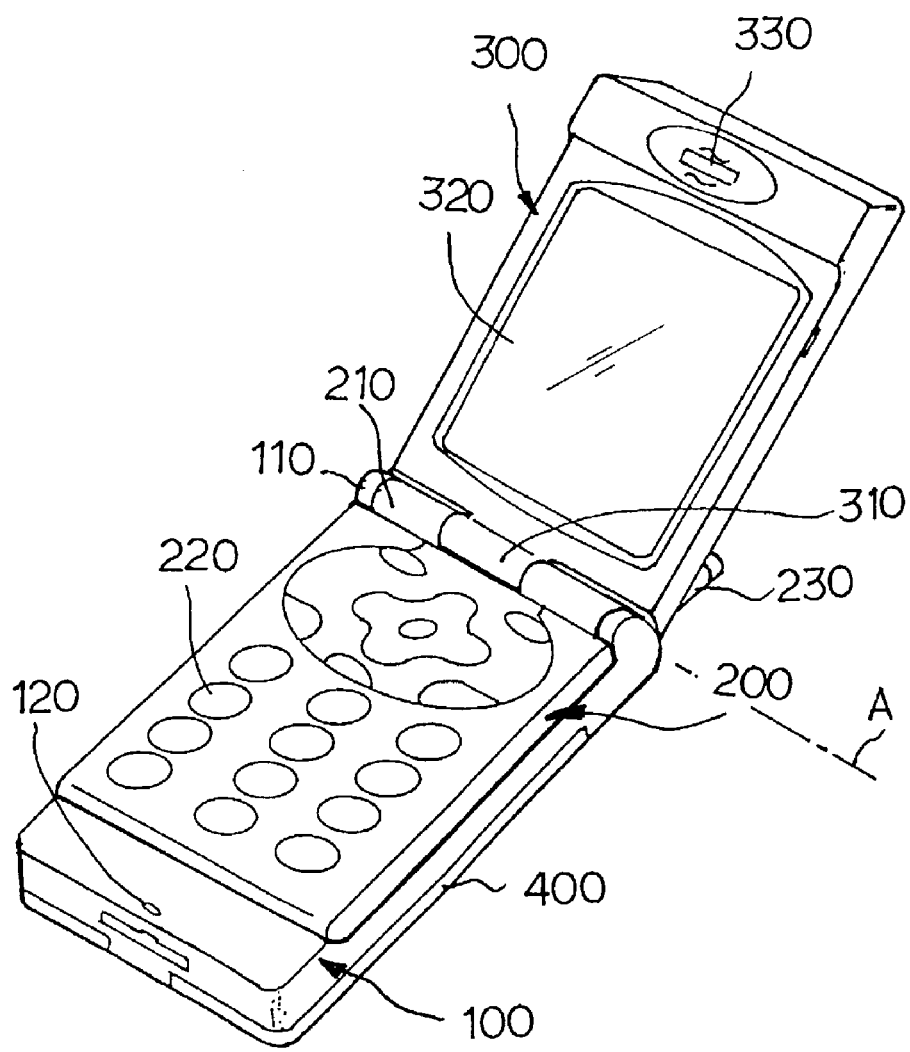
FIG. 4 is a perspective view showing a state in which an upper housing of the radio telephone according to the embodiment of the present invention is unfolded away from the lower and middle housings of the radio telephone.
Figure 5:
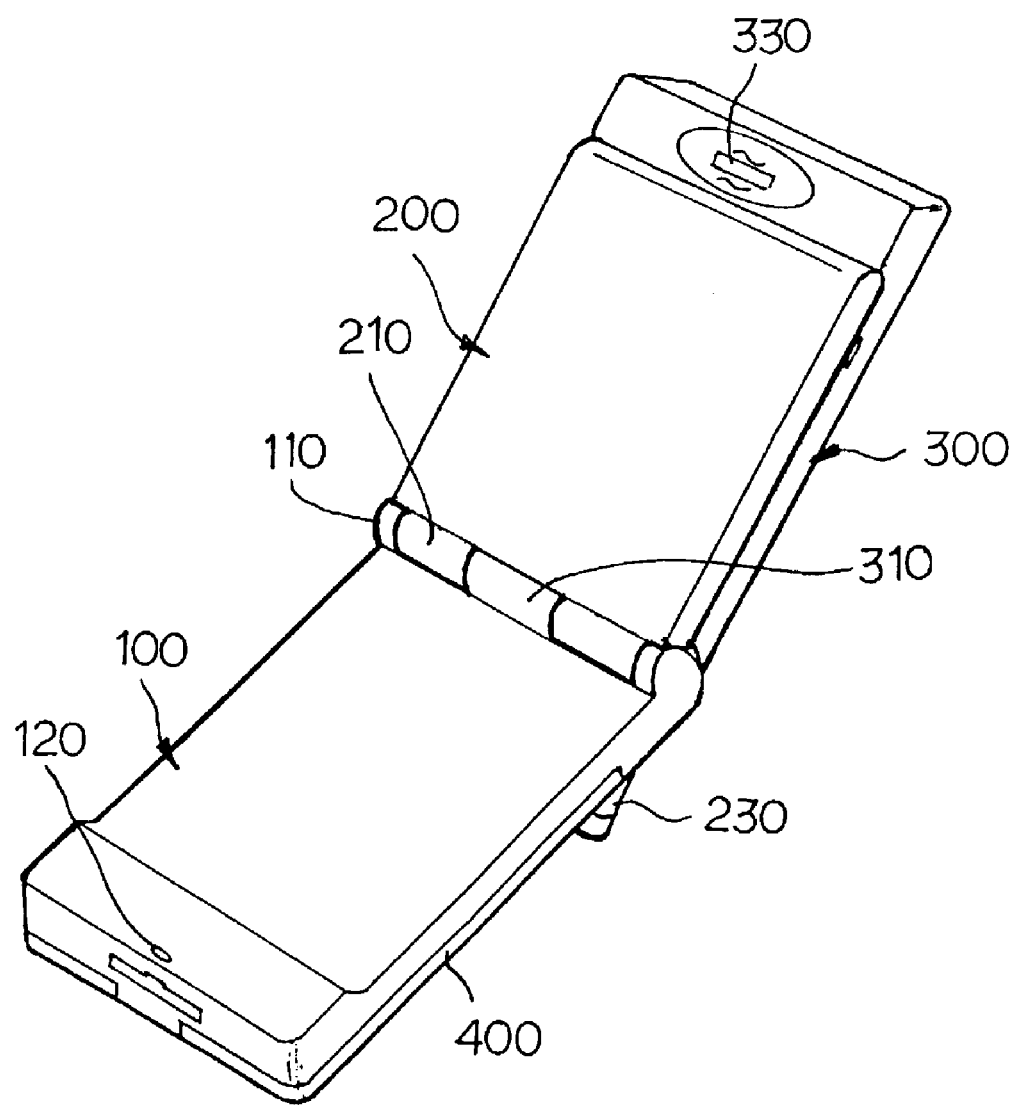
FIG. 5 is a perspective view showing a state in which the middle housing of the radio telephone according to the embodiment of the present invention is unfolded away from the lower housing of the radio telephone.

When the LCD and the keypad are required for accessing the Internet and performing character services using the dual-wing folder radio telephone, only the upper housing 300 is unfolded from the middle housing 200 and the lower housing 100. In this case, the unfolding is between the upper housing 300 and the middle housing 200, as depicted in FIG. 4. During the telephone call, the middle housing 200 is unfolded away from the lower housing 100. In this case, the unfolding is between the middle housing 200 and the lower housing 100, as depicted in FIG. 5.

In the case where the dual-wing folder radio telephone is folded in an initial state, when a user uses the dual-wing folder radio telephone as an information apparatus for accessing the Internet, only the upper housing 300 is unfolded away from the middle housing 200 and the lower housing 100, allowing the keypad 220 of the middle housing 200 to be used. When the user receives a telephone call during an access to the Internet, the user can answer the telephone call by unfolding the middle housing 200 away from the lower housing 100. At this time, the antenna 230 installed in the hinge arm 210 of the middle housing 200 rotates as the middle housing 200 is unfolded away from the lower housing 100, resulting in the antenna 230 facing the ground and away from the face and body of the user. As a result, it is possible to reduce the amount of the electromagnetic energy to which the human body is exposed during the telephone call. When the middle housing 200 is folded against the lower housing 100, the telephone call is terminated and the dual-wing folder radio telephone enters a suspended state. Accordingly, it is possible to use the dual-wing folder radio telephone as an information search telephone or information apparatus.

When the user makes a telephone call while using the dual-wing folder radio telephone as the information apparatus for accessing the Internet, the user inputs a telephone number by the keypad of the middle housing 200, inputs a SEND key, and then unfolds the middle housing 200 from the lower housing 100 after checking connection of a telephone call through the LCD, to thus make the telephone call. Alternatively, unfolding the middle housing 200 away from the lower housing 100 after inputting the telephone number using the keypad 220 may be equivalent to pressing the SEND key. Accordingly, the telephone call is made. The telephone call is terminated by folding the middle housing 200 or upper housing 300 to the lower housing 100. When the middle housing 200 is not used like in the conventional folder, the telephone call can be made using the SEND key. When the telephone call is terminated by the END key of the keypad, the dual-wing folder radio telephone is transitioned to the suspended state in which the user can enjoy the Internet service by operating the dual-wing folder radio telephone as an information apparatus.

In the case where the dual-wing folder radio telephone is folded in the initial state, when the telephone rings, the user answers the telephone call by unfolding the middle housing 200 from the lower housing 100. At this time, the upper housing 300 will naturally remain unfolded. When the telephone call is terminated by folding the upper housing 300 against the lower housing 100, the middle housing 200 is automatically folded therebetween. After making a telephone call by unfolding the middle housing 200 away from the lower housing 100, the telephone call can be terminated by changing the fold of only the middle housing 200 transitioning, the radio telephone to the suspended state to allow the user to access the Internet. When the upper housing 300 in this state is folded against the lower housing 100, connection to the Internet is terminated.

The upper housing 300 and the middle housing 200 are independently foldable toward and unfoldable away from the lower housing 100 centering on the hinge axis A within a call angle. The "call angle" means the angle at which the upper housing 300 and the middle housing 200 are unfolded away from the lower housing 100. Here, the call angle between the upper housing 300 and the lower housing 100 is between about 135° and 160°.

While the invention has been shown and described with reference to a certain preferred embodiment thereof, it will be understood by those skilled in the art that various changes in form and details may be made therein without departing from the spirit and scope of the invention as defined by the appended claims. For example, the three housings are connected to one hinge means according to the present invention. However, four or more housings can be connected to the hinge means, with more functions being added as more housings are added. Accordingly, it will become more convenient for the user to use the dual-wing folder radio telephone.

As mentioned above, according to the present invention, it is possible to separate services using the LCD and the keypad from a telephone call service in the radio telephone where the three housings are connected to one hinge means. The need for the user to remove alien objects or other contaminants after the telephone call is not required because the LCD and the keypad are protected against the contamination by the middle housing during the telephone call. The unpleasantness commonly caused by contaminants such as cosmetics, sweat and body wastes, is thereby reduced without limiting use of the telephone. This prevents mis-operation of the LCD and the keypad, and preserves the viewability of the LCD. Because the antenna faces the ground during the telephone call, the amount of the electromagnetic energy to which the human body is exposed is minimized. The dual-wing folder radio telephone of the present invention can further prevent the LCD from being polluted by the alien objects such as sweat and cosmetics and provide the user a more pleasant telephone and reduce the harm inflicted to the human body by adding an electromagnetic wave intercepting means such as a rubber pad on the surface of the middle housing that contacts the user's face during a call.

What is claimed is:

1. A dual-wing folder radio telephone comprising:
a lower housing, a middle housing, and an upper housing, each connected to one hinge axis, wherein:
the lower housing includes a first hinge arm formed in one end thereof a battery mounted on a lower surface and a microphone mounted on an upper surface;
the middle housing includes a second hinge arm formed in one end thereof, a keypad, in which a plurality of keys are arranged, installed on an upper surface thereof and a main printed circuit board installed therein; and
the upper housing includes a third hinge arm formed in one end, a liquid crystal display (LCD) and a speaker.

2. The dual-wing folder radio telephone of claim 1, wherein an antenna is installed in the second hinge arm.

3. The dual-wing folder radio telephone of claim 1, wherein the telephone is used as an information apparatus for accessing the Internet when the upper housing is unfolded.

4. The dual-wing folder radio telephone of claim 1, wherein a telephone call is made when the middle housing is unfolded away from the lower housing after inputting a telephone number.

5. The dual-wing folder radio telephone of claim 1, further comprising a rubber pad, capable of reducing electromagnetic energy, interposed between the middle housing and the lower housing.

6. The dual-wing folder radio telephone of claim 2, wherein the antenna of the middle housing faces away from the user towards the ground during a telephone call.

7. The dual-wing folder radio telephone of claim 1, wherein the middle housing is interposed between the upper housing and the lower housing.

* * * * *